United States Patent [19]
Yasumatsuya

[11] 3,723,804
[45] Mar. 27, 1973

[54] VERTICAL DEFLECTION DEVICE UTILIZING RECTIFYING MEANS FOR DEFLECTION CONTROL

[75] Inventor: Noboru Yasumatsuya, Kadoma-shi, Japan

[73] Assignee: Matsushita Electric Industrial Co., Ltd., Osaka, Japan

[22] Filed: Dec. 7, 1970

[21] Appl. No.: 95,677

[30] Foreign Application Priority Data

Dec. 12, 1969 Japan ..............................44/100399

[52] U.S. Cl. ..............................................315/276 D
[51] Int. Cl...............................................H01j 29/70
[58] Field of Search...315/27, 28, 29, 27 TD, 27 GD, 315/26

[56] References Cited

UNITED STATES PATENTS

| | | | |
|---|---|---|---|
| 3,604,974 | 9/1971 | Phillips et al. | 315/27 TD |
| 3,488,554 | 1/1970 | Voige | 315/27 TD |

*Primary Examiner*—Carl D. Quarforth
*Assistant Examiner*—J. M. Potenza
*Attorney*—Stevens, Davis, Miller & Mosher

[57] ABSTRACT

A vertical deflection device which comprises deflection-signal generating means for producing deflection signals to be applied to a cathode-ray tube, rectifying means to rectify the deflection signals, and controlling means to control the deflection-signal generating means by the rectified voltages of the deflection signals, whereby an operation for correcting the deflection signal to a substantially S-shaped signal in order to prevent tangent distortions from appearing for the reason that a projecting screen of the cathode-ray tube is not spherical, may be easily effected.

6 Claims, 7 Drawing Figures

Figure 1:
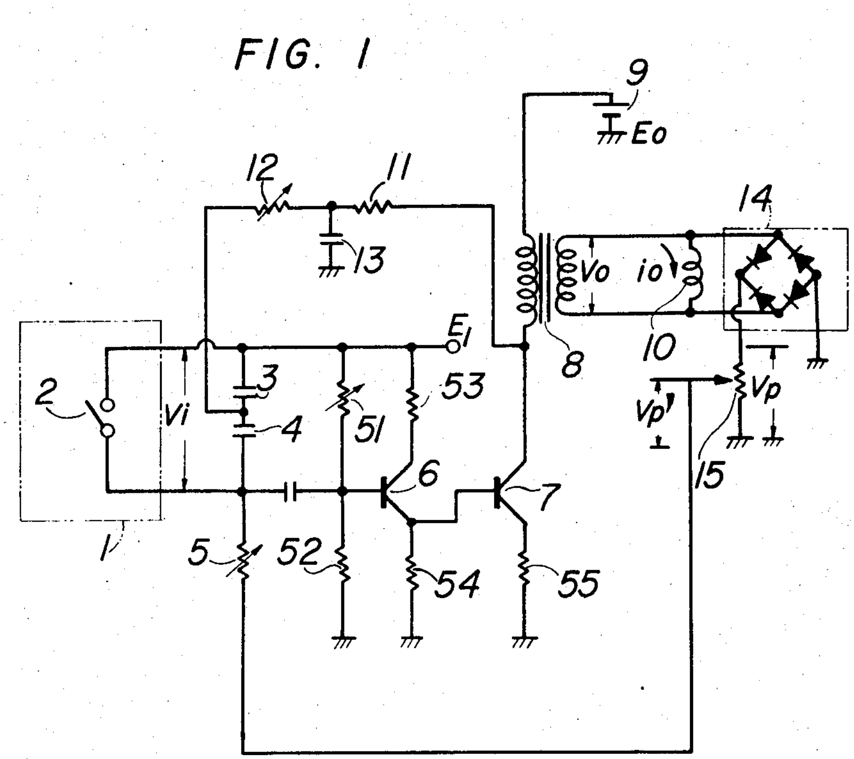
Figure 2A:
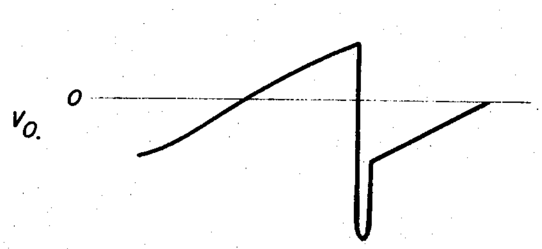
Figure 2B:
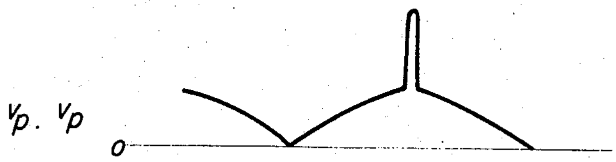
Figure 2C:
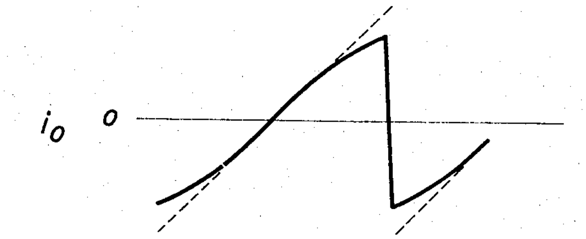
Figure 2D:
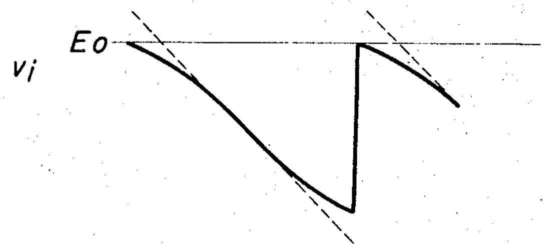

N. YASUMATSUYA
INVENTOR

BY Stevens, Davis, Miller & Mosher
ATTORNEYS

INVENTOR

BY

ATTORNEY

VERTICAL DEFLECTION DEVICE UTILIZING RECTIFYING MEANS FOR DEFLECTION CONTROL

This invention relates to a vertical deflection device.

In order to correct tangent distortions appearing in a deflection circuit of television set etc. on the ground that the face of a cathode-ray tube is not spherical with respect to the deflection center, a deflection current should be transformed into an S-shape. As regards a vertical deflection circuit, there has heretofore been used such a method in which a circuit consisting or resistors and capacitors is incorporated into a linearity correcting circuit or in which non-linearity of an amplifying element is utilized. However, the prior art methods have been disadvantageous in that the upper and lower corrected amounts in the S-letter shape may not be simultaneously changed and that the upper and lower corrected amounts are hard to make equal.

This invention intends to eliminate such disadvantages, and has an object in that the upper and lower corrected amounts in the S-letter shape of a deflection current to be supplied to a cathode-ray tube are simultaneously varied to thereby facilitate an adjustment for removing tangent distortions.

Another object of this invention is to remove tangent distortions independently of the problem of linearity of the deflection current without taking advantage of the non-linearity of an amplifying element constituting a deflecting device.

Still another object of this invention is to accomplish the above two objects with a simple circuit arrangement.

In a conventional, vertical deflection circuit, not specific circuit for correcting tangent distortions is employed. Instead, such a method as follows is put into practice for the correction. Various types of feedback are, in general, performed in order to correct linearity. The frequency and phase characteristics of such feedback circuit are varied by the values of resistors and capacitors in the feedback circuit, whereby tangent distortions are corrected simultaneously with the linearity of the entire circuit arrangement. Generally, a saw-tooth wave current through a deflecting coil tends to be distorted in the form of an exponential function. Namely, a slower slope is exhibited at the termination of the scanning than at the initiation of the same. Then, the feedback circuit as referred to above is adapted to make the slope slow at the beginning part of the scanning. A further method is used in which the above feedback circuit is combined with non-linearity of an amplifying element. According to such prior art methods, the correction of tangent distortions is effected along with that of the entire linearity, so that it may not be independently adjusted. As a result, the adjustment of the linearity also becomes complicated. In addition, the upper and lower corrections of tangent distortions may not be simultaneously adjusted to the disadvantage.

Figures 3, 4:
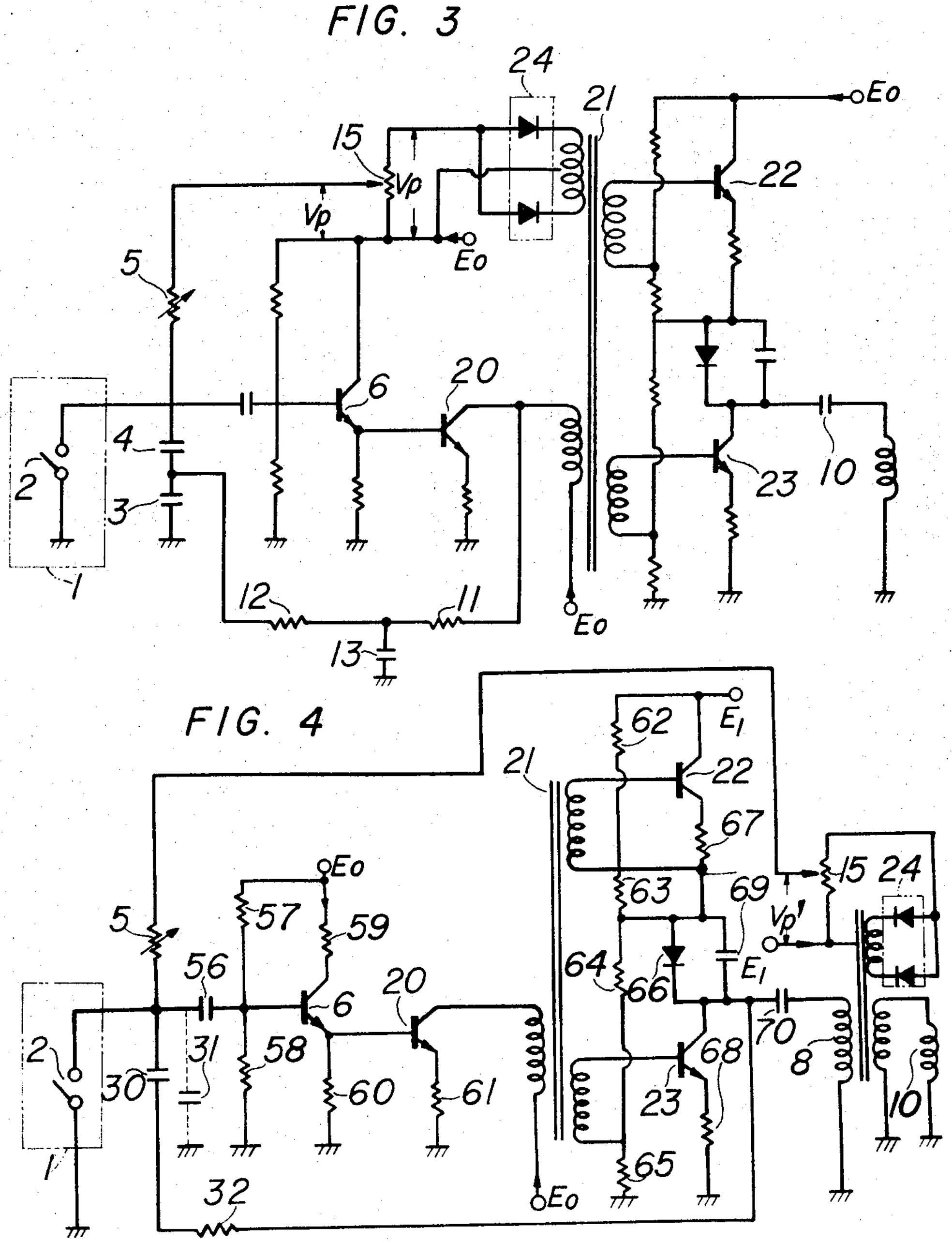

This invention will be clarified by the following detailed description taken in conjunction with the accompanying drawings, in which:

FIG. 1 is a circuit diagram of an embodiment of this invention;

FIGS. 2*a* to 2*d* are graphs for explaining the operation of the embodiment; and FIGS. 3 and 4 are circuit diagrams showing further embodiments, respectively.

Description will now be made of the embodiment of the invention shown in FIG. 1. In the figure, numeral 1 designates a switching circuit consisting of, e.g., a blocking oscillator, with numeral 2 an equivalent switch thereto. Numerals 3 and 4 designate charging capacitors for generating a saw-tooth wave voltage, respectively. Shown at 5 is a charging resistor, by means of which the saw-tooth wave voltage to be produced is varied. Numeral 6 represents a drive transistor, 7 an output transistor, 8 a vertical transformer, 9 a power source, and 10 a vertical deflection coil. In order to improve linearity, positive feedback is performed from the collector electrode of the output transistor to the junction point between the capacitors 3 and 4 by a network consisting of resistors 11 and 12 and a capacitor 13. Further numeral 51 and 52 designate base bias resistors, respectively, 53 an emitter resistor, and 54 a collector resistor. Since the above circuits are known, the operation thereof will now be explained only briefly. The switch 2 is kept conductive during a period of retrace by a synchronizing signal, so that charges stored in the capacitors 3 and 4 are discharged. Accordingly a voltage $v_i$ (FIGS. 1 and 2*d*) across both the capacitors becomes zero. When the switch 2 is turned off, the capacitors will be charged through the charging resistor 5 towards the voltage of the power source. The voltage $v_i$ therefore becomes a saw-tooth wave one, which is amplified by the transistors 6 and 7 and causes, via the output transformer 8, a saw-tooth wave current to flow through the deflecting coil 10.

A feature of this invention resides in that the charging voltage of the charging capacitors 3 and 4 is decreased at the beginning and ending parts of the scanning, whereby the deflection current is made S-shaped to correct tangent distortions. The operation will be further described, with reference to FIG. 1 and to FIG. 2 showing voltage and current wave forms of the individual parts.

When a saw-tooth wave voltage $v_o$ (FIGS. 1 and 2*a*) appearing across both terminals of the deflecting coil 10 is supplied to a bridge circuit 14 composed of four diodes, then a correcting voltage $v_p$ (FIGS. 1 and 2*b*) owing to full-wave rectification of the voltage $v_o$ will be produced across both terminals of a variable resistor 15. The charging resistor 5 is connected to a movable terminal of the variable resistor 15. In other words, the charging resistor 5 is earthed through the correcting voltage $v_p$ being divided to a suitable value. With the above arrangement, a voltage for charging the charging capacitors 3 and 4 becomes $E_o - v'_p$ (see FIGS. 1 and 2*b*). As apparent from FIG. 2*b*, the voltage $v'_p$ has a certain positive value at both the beginning and the end of the scanning, and becomes substantially zero at the middle part of the same. Accordingly, the charging voltage is lower at the initial and terminal parts of the scanning than at the middle part of the same. As a result, the speed of charging becomes gentle at the beginning and ending parts of the scanning. The voltage $v_i$ thus becomes as shown by solid lines in FIG. 2*d*. Incidently, dotted lines in the figure illustrate the case where the charging voltage is not subject to such decrease. On the basis of the above-explained principle and operation, an S-shaped saw-tooth wave current $i_o$ (FIGS. 1 and 2*c*) with tangent distortions corrected is caused to flow through the deflecting coil 10. The amount of correction may be adjusted independently of linearity and with the upper and lower corrected amounts being equal, by varying the voltage $v'_p$. Accordingly the correcting operation for tangent distortions is facilitated.

While in the foregoing embodiment the correcting voltage has been obtained by rectifying the terminal voltage of the output transformer with the bridge circuit, this invention is not restricted thereto.

FIG. 3 shows a further embodiment in which this invention is applied to a B-class single-ended push-pull vertical deflection circuit using a drive transformer 21 and output transistors 22 and 23. In the figure, elements being the same in operation as those in FIG. 1 are assigned with the same reference numerals. Herein the correcting voltage $v_p$ is gained across the variable resistor 15 in such a way that a saw-tooth wave voltage appearing at a separate winding wound in the drive transformer 21 is subjected to full-wave rectification by means of two diodes 24. In this case, the middle point of the separate winding should be therefore connected to one terminal of the variable resistor 15. The principle for correction of tangent distortions is the same as in FIG. 1. Namely, the charging voltage applied across the resistor 5 and the charging capacitors 3 and 4 is decreased at the initial and terminal parts of the scanning by the correcting voltage $v'_p$, whereby an S-shaped saw-tooth wave current is supplied to the deflecting coil 10. It is to be understood that a bridge rectifier circuit consisting of four diodes may also be utilized herein in place of the full-wave rectifier circuit composed of the two diodes. Furthermore, the invention is similarly applicable to the cases where the output transistors 22 and 23 operate in AB-class or A-class rather than in B-class.

FIG. 4 shows a still further embodiment. To facilitate understanding, elements similarly operate as in FIGS. 1 and 3 are assigned with the same reference characters. Far different from the embodiment in FIG. 3 is that a saw-tooth wave voltage is generated by a Miller integrator. More specifically, the collector electrode of the output transistor 23 is connected through a resistor 32 and a Miller integration capacitor 30 to the base electrode of the transistor 6. As is known, the Miller integration capacitor 30 is equivalent to a capacitor 31 (illustrated by a dotted line in the figure) the capacitance of which is raised in accordance with the amplification degree of the circuit. The capacitor 30 may be accordingly regarded as the capacitors 3 and 4, while the resistor 5 serves as the charging resistor. The correcting voltage $v'_p$ is acquired in such a way that a saw-tooth wave voltage generated at a separate winding provided in the output transformer 8 is full-wave-rectified by the two diodes 24. The principle in operation is the same as in FIG. 3.

In this embodiment, numeral 56 indicates a coupling capacitor, 57 and 58 base bias resistors, respectively, 59 a collector resistor, 60 and 61 emitter resistors, respectively, 62 to 65 voltage divider resistors, respectively, 66 a diode, 67 and 68 emitter resistors, respectively, 69 a capacitor connected in parallel with the diode 66, and 70 a capacitor for supplying output to the transformer 8.

As described above, according to this invention, tangent distortions may be corrected independently of the main linearity adjustment and with the upper and lower corrected amounts being equal. Therefore the circuit adjustment is facilitated to the advantage.

The electrical characteristic values (capacitances or resistances etc.) or the designations of the elements constituting the above embodiments of this invention, will now be mentioned in the following tables. Table 1 is for the constituting elements of the embodiment shown in FIG. 1, while Table 2 is for those of the embodiment illustrated in FIG. 4.

TABLE 1

| Character | Electrical Characteristic Value or Designation | Character | Electrical Characteristic Value or Designation |
|---|---|---|---|
| 3 | 33 μF | 13 | 0.1 μF |
| 4 | 4.7 μF | 14 | FR − 1 × 4 |
| 5 | 50 K Ω | 15 | 1 K Ω |
| 6 | 2SA550A | 51 | 500 K Ω |
| 7 | 2SD199 | 52 | 33 K Ω |
| | 2.5 : 1 | 53 | 150 Ω |
| 9 | 120 V | 54 | 2.2 K Ω |
| 10 | 40 mH, 25 Ω | 55 | 100 Ω |
| 11 | 1 K Ω | $E_1$ | 24 V |
| 12 | 5 K Ω | | |

TABLE 2

| Character | Electrical Characteristic Value or Designation | Character | Electrical Characteristic Value or Designation |
|---|---|---|---|
| 5 | 200 K Ω | 59 | 10 Ω |
| 6 | 2SC538A | 60 | 3.3 K Ω |
| 10 | 20 mH, 20 Ω | 61 | 100 |
| 15 | 10 K Ω | 62 | 4.7 K Ω |
| 20 | 2SC696 | 63 | 33 |
| 22 | 2 SD199 | 64 | 4.7 K Ω |
| 23 | 2SD199 | 65 | 33 |
| 24 | FR1 × 2 | | FR1M |
| 30 | 0.22 μF | 67 | 2.2 Ω |
| 32 | 2.7 K Ω | 68 | 2.2 Ω |
| 56 | 1μF | 69 | 0.22μF |
| 57 | 220 K Ω | 70 | 200 μF |
| 58 | 100 K Ω | $E_0$ | 24 V |
| | | $E_1$ | 170 V |

What is claimed is:

1. A vertical deflection device comprising means to detect a saw-tooth wave signal to be applied to a cathode-ray tube, the center of said saw-tooth wave having a zero potential, means to full wave rectify a signal detected by said detecting means, and means to apply a voltage obtained by the rectification to a circuit for generating said saw-tooth wave signal, thereby to control said circuit.

2. A vertical deflection device wherein a rectifier circuit is connected in parallel with a deflecting coil of a cathode-ray tube, and wherein means is provided which applies an output from said rectifier circuit to a circuit for generating a saw-tooth wave signal, thereby to control said circuit.

3. A vertical deflection device according to claim 1, wherein said detecting means comprises a separate winding for detection of said saw-tooth wave signal, which winding is wound in a drive transformer for driving an output transistor connected to said cathode-ray tube and for amplification of said saw-tooth wave signal.

4. A vertical deflection device according to claim 1, wherein said detecting means comprises a separate winding for detection of said saw-tooth wave signal, which winding is wound in a vertical deflection output transformer connected to said cathode-ray tube.

5. A vertical deflection device according to claim 1, wherein said means to control said circuit for generation of said saw-tooth wave signal comprises an integrating capacitor constituting said circuit, one terminal of said capacitor having an output signal of said rectifying means applied thereto.

6. A vertical deflection device according to claim 2, wherein said rectifier circuit comprises a bridge rectifier circuit.

* * * * *